Figure 1A:
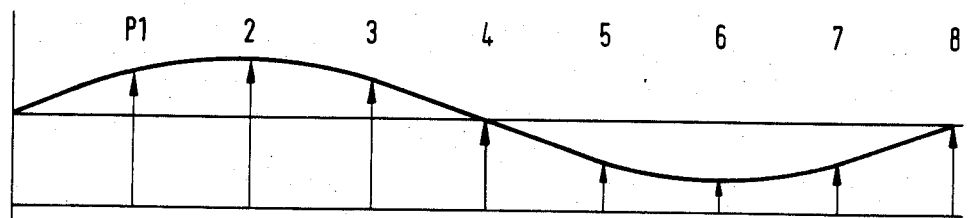

United States Patent [19]

Dirr

[11] Patent Number: 4,731,798
[45] Date of Patent: Mar. 15, 1988

[54] METHOD FOR TRANSMITTING INFORMATION, IN WHICH THE SIGNALS ARE CODED AS AMPLITUDES OF THE HALF-WAVES OR PERIODS OF A SINUSOIDAL ALTERNATING CURRENT

[76] Inventor: Josef Dirr, Neufahrner Strasse 5, 8000 München 80, Fed. Rep. of Germany

[21] Appl. No.: 558,772

[22] Filed: Dec. 6, 1983

[30] Foreign Application Priority Data

Dec. 7, 1982 [DE] Fed. Rep. of Germany ....... 3245237
Aug. 4, 1983 [DE] Fed. Rep. of Germany ....... 3328249
Aug. 4, 1983 [DE] Fed. Rep. of Germany ....... 3328268
Nov. 8, 1983 [DE] Fed. Rep. of Germany ....... 3340378

[51] Int. Cl.$^4$ .................. H04K 1/10; H04L 27/28
[52] U.S. Cl. .................................... 375/38; 370/20; 375/39
[58] Field of Search ............ 375/24, 37, 38, 39, 375/41; 370/20, 14; 455/60, 105

[56] References Cited

U.S. PATENT DOCUMENTS

| | | | |
|---|---|---|---|
| 3,378,771 | 4/1968 | Van Ggrwen et al. | 455/60 |
| 3,440,346 | 4/1969 | Worby | 375/37 |
| 3,622,885 | 11/1971 | Kroszynski | 375/38 |
| 3,919,641 | 11/1975 | Kurokawa et al. | 375/37 |
| 4,015,204 | 3/1977 | Miyazawa | 375/38 |
| 4,267,591 | 5/1981 | Wissel et al. | 375/38 |
| 4,347,616 | 8/1982 | Murakami | 370/20 |
| 4,355,397 | 10/1982 | Stuart | 370/20 |
| 4,464,767 | 8/1984 | Bremer | 370/20 |

FOREIGN PATENT DOCUMENTS 532398 10/1954 Belgium .................. 375/37

Primary Examiner—Joseph A. Orsino, Jr.
Attorney, Agent, or Firm—Kuhn and Muller

[57] ABSTRACT

Due to pulse amplitude modulation (PAM) there is an unwanted signal being undesirably strong and a broadening of the frequency band as a result of the pulses. In the case of digital binary-coding of signals with half-waves or periods of an alternating current and the code elements having small and large amplitude values, high frequencies are required. In the present invention, the samples of the pulse amplitude modulation of signals ranging from single polar/binary to continuous are being coded by half-waves or periods of an alternating current, also providing alternating currents of a lower frequency with predetermined mutual phase shifting for the samples. Due to these measures the aforementioned shortcomings are avoided.

20 Claims, 30 Drawing Figures

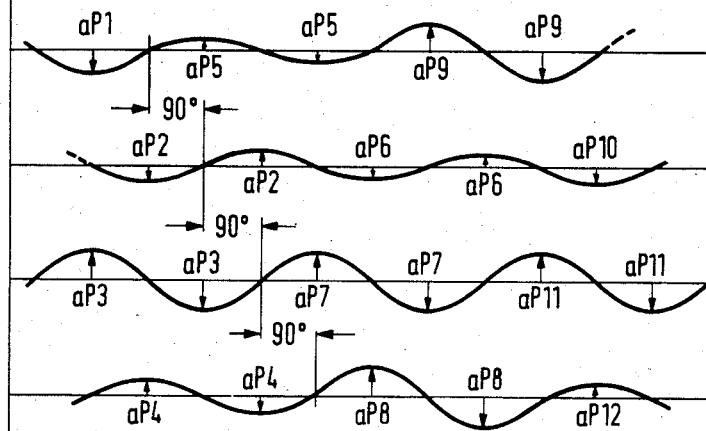
Fig. 2a
Fig. 2b
Fig. 2c
Fig. 2d
Fig. 2e
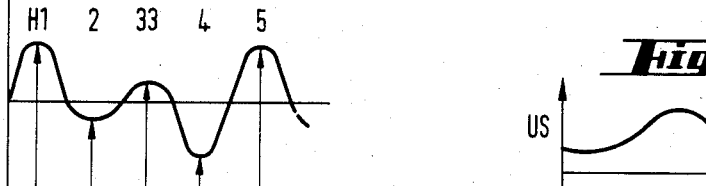
Fig. 3a
Fig. 3b
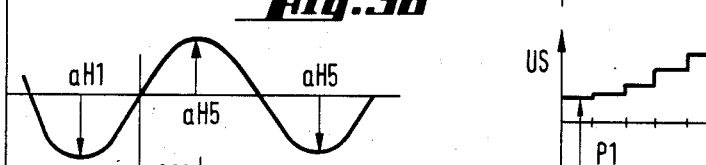
Fig. 3c
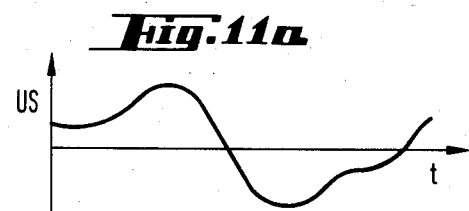
Fig. 11a
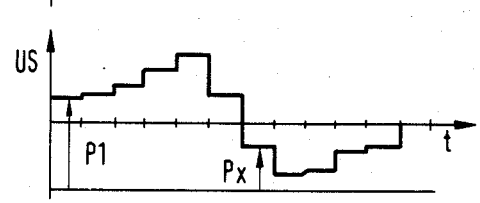
Fig. 11b

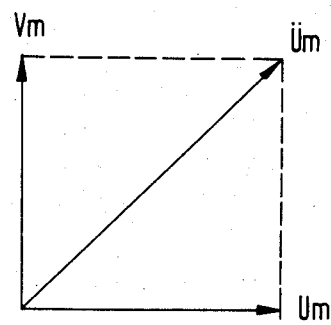
Fig. 13
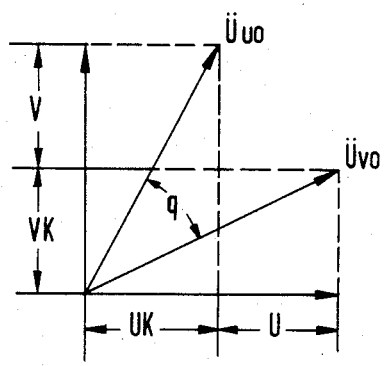
Fig. 14
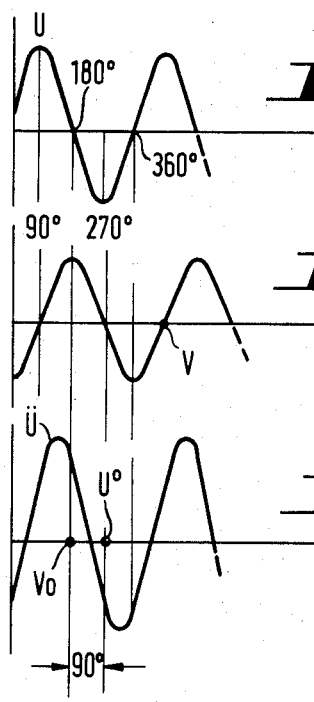
Fig. 15a
Fig. 15b
Fig. 15c

METHOD FOR TRANSMITTING INFORMATION, IN WHICH THE SIGNALS ARE CODED AS AMPLITUDES OF THE HALF-WAVES OR PERIODS OF A SINUSOIDAL ALTERNATING CURRENT

The present invention relates to a method for the transmission of information, which method involves coding the signals by way of the magnitude of the amplitudes of the half-waves or periods of a uniform, in particular a sinusoidal alternating current that is transmitted in a continuous sequence of (positive and negative half-waves or periods (full waves).

This method can be applied, for example, in the case of pulse amplitude modulation (PAM). In the known methods the amplitude of the carrier pulse is varied. Due to the unwanted signal being undesirably strong, PAM has up till now not been employed on transmission paths, but only as a preliminary stage in the case of pulse-code modulation (PCM). A further disadvantage of PAM was the broadening of the frequency band as a result of the pulse. Digital transmission methods in which the half-waves or periods of an alternating current serve as binary code elements are well-known (e.g. DE-PS No. 30 10 938 C2), but high frequencies—which cannot be used on all transmission paths—are necessary for the transmission.

It is the object of the present invention to provide a method with which it is possible to transmit signals within a narrow bandwidth and/or with low frequencies, at the same time avoiding the drawbacks of the known transmission systems.

Figure 1B:
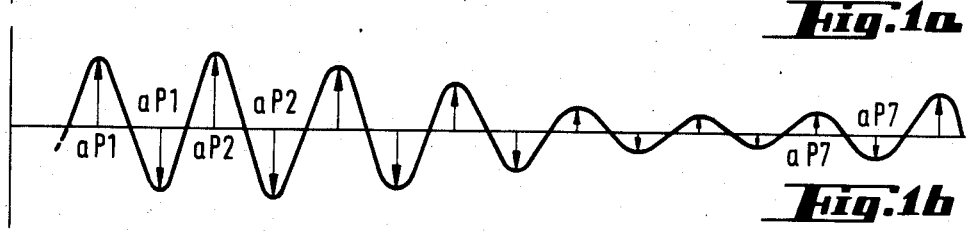
Figure 1C:
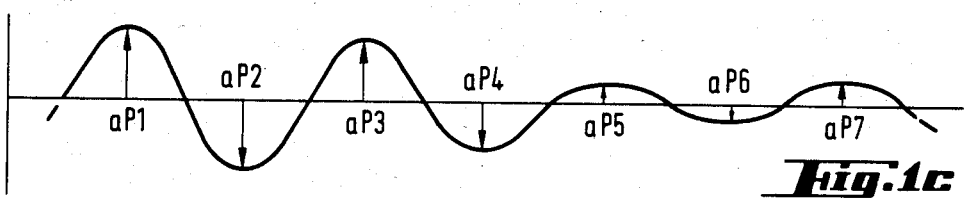
Figure 1D:
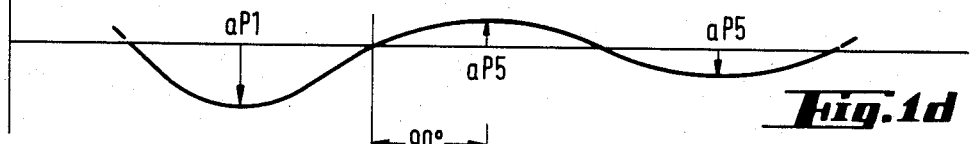
Figure 4:
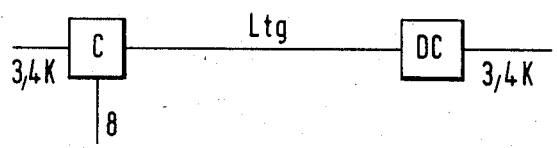
Figure 5:
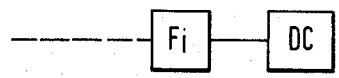
Figure 6:
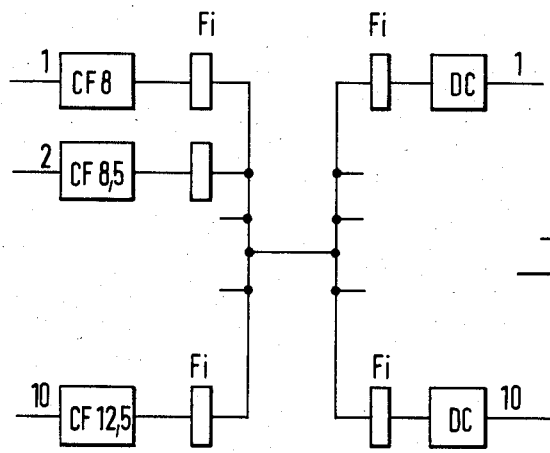
Figure 7:
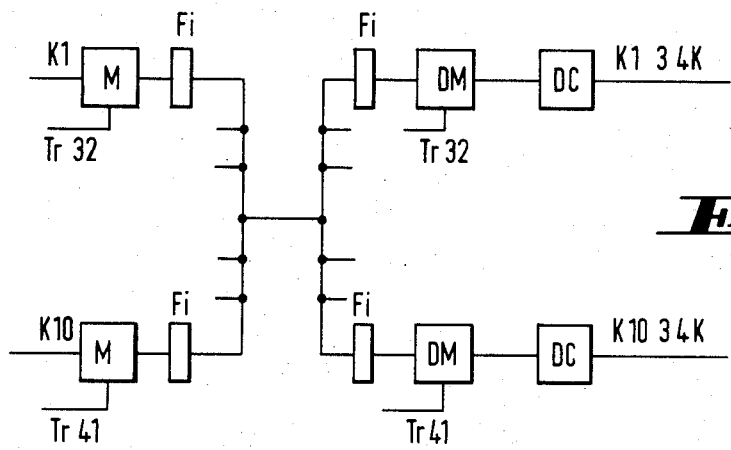
Figures 8, 9:
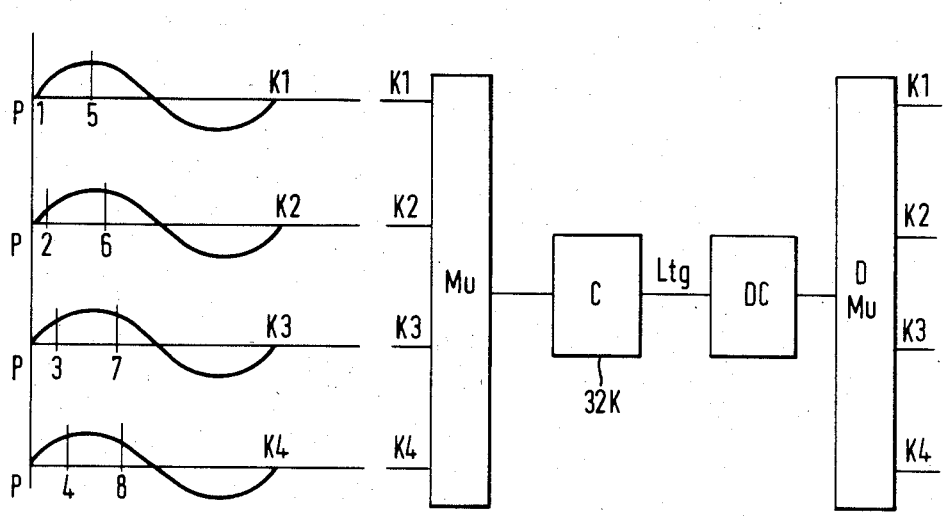
Figure 10:
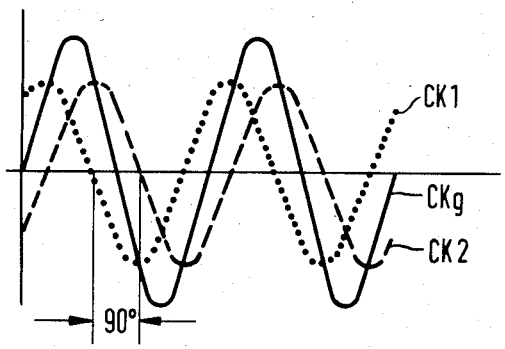
Figure 12:
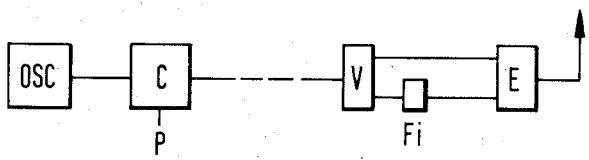

The invention will now be described in more detail by referring to the drawings, which show, in FIG. 1a 8 samples taken from a cycle;

FIG. 1b,1c coding alternating currents with periods or half-waves as coding means;

FIG. 1d,e,f,g 4 coding alternating currents, each of 2 kHz, in phase quadrature with respect to each other;

FIG. 2a a binary-coded alternating current with the periods as code elements;

FIG. 2b,c,d,e a binary-coded alternating current is pulse-amplitude-modulated with 4 alternating currents which are in phase quadrature and each have one quarter of the frequency of the binary-coded alternating current;

FIG. 3a a sampled, binary-coded alternating current with the half-waves as code elements;

FIG. 3b,c a binary-coded alternating current with the half-waves as code elements is pulse-amplitude-modulated with 4 alternating currents (only 2 of which are shown) in phase quadrature;

FIGS. 4, 5 principle of speech transmission coding alternating the invention;

FIG. 6 a parallel transmission of coding alternating currents via a line;

FIG. 7 a carrier frequency transmission of coding alternating currents;

FIGS. 8, 9 a time-division multiplex transmission of coding alternating currents;

FIG. 10 superposing of two alternating currents in phase quadrature;

FIG. 11a,11b conversion of an analog input signal into an amplitude-continuous signal;

FIG. 12 identity of coding alternating current and transmitting alternating current for radio;

FIG. 13,14,15a–c Compensation for phase shifts in the case of superposition.

FIG. 1a shows 8 samples P1 to 8 taken from a cycle. The value of each sample is coded by way of the amplitude of a period (FIG. 1b) or half-wave (FIG. 1c) of a uniform, in particular a sinusoidal alternating current, the coding alternating current. In FIG. 1b the period (full wave) serves as code element. The sample P1 of FIG. 1a is transmitted analogically on the positive and negative half-waves with amplitude values aP1 and aP1, sample P2 on the two half-waves aP2/aP2, sample P7 on the two half-waves aP7/aP7 etc. If the half-wave of the coding alternating current is used as code element, sample P1 of FIG. 1a becomes the amplitude aP1 of the half-wave, sample P2 the amplitude aP2 of the half-wave, sample P7 the amplitude aP7 of the half-wave etc., as can be seen from FIG. 1c. Conversions of analog amplitudes and time-continuous signals into amplitude-continuous signals are known and are employed as preliminary stage in pulse-code modulation (e.g. the journal "Elektronik", issue no. 1, 1980, page 85); further details are accordingly unnecessary. In FIGS. 11a and 11b the principle of such a conversion is shown. US are the signal voltages, and t the time axis. P1, . . . Px are the samples. Using a sampling circuit (sample and hold), the analog input signal of FIG. 11a is converted into the amplitude-continuous signal of FIG. 11b. Making use of the valve characteristics (grid voltage) or transistor characteristics one can then, in known manner, convert the amplitude-continuous signal into an alternating current with the corresponding amplitudes.

According to the International Telegraph and Telephone Consultative Committee (ITTCC) the sample frequency for speech bonds is 8 kHz; this means that in FIG. 1b the code frequency is likewise 8 kHz, while in FIG. 1c a frequency of 4 kHz suffices. One can halve the code frequency if e.g. one codes the samples P1, P3, P5 etc. with one alternating current, and the samples P2, P4, P6 etc. with another alternating current of the same frequency. The two alternating currents must then be phase shifted by 180° in respect of each other. Both alternating currents of halved frequency can then be transmitted with a single alternating current if an additional phase shift of 90° is undertaken and both alternating currents are superposed. The principle is shown in FIG. 10. CK1 and CK2 represent two alternating currents of the same frequency and in phase quadrature with respect to one another. CKg is the sum alternating current, which has the same frequency as the individual alternating currents. In quadrature amplitude modulation this principle is known, so there is no need to go into further detail. In order to obtain the equally-spaced samples at the receiving end again, the 90° phase shift must be cancelled again.

In the FIGS. 1d,e,f,g four alternating currents in phase quadrature with respect to each other serve to code the sample, so that with periods as code element a frequency of 2 kHz is required for each of the alternating currents.

Figure 1E:
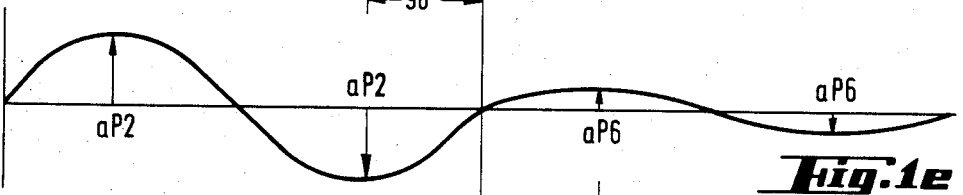
Figure 1F:
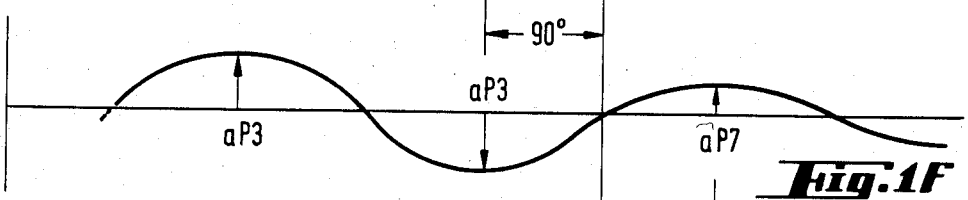
Figure 1G:
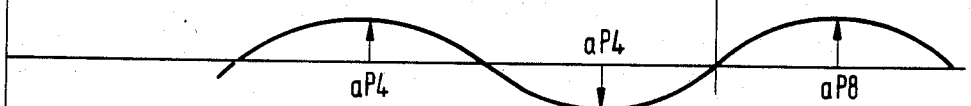

In FIG. 1d samples P1, P5, . . . are coded with amplitudes aP1, aP5, . . . , in FIG. 1e samples P2, P6, . . . with amplitudes aP2, aP6, . . . , in FIG. 1f samples P3, P7, . . . with amplitudes aP3, aP7, . . . and in FIG. 1g samples P4, P8, . . . with amplitudes aP4, aP8. In accordance with FIG. 10 one can now combine two alternating currents in phase quadrature, superpose them and transmit them along the line as a single alternating current. If the same code frequency is used, different transmission paths must be available for the two superposed alternating currents, in the example one for the superposed alternating current FIG. 1d/1e and one for the superposed current FIG. 1f/1g. One can also choose a different sample frequency for each speech band, e.g. 8 kHz, 12 kHz, . . . In the latter case 3 kHz can serve 4 times as code frequency, and then 2 code alternating currents can be superposed again. Superposed alternating currents of 2 kHz and 3 kHz can then be brought together by way of filters and fed to a carrier frequency speech channel. At the receiving end, the 2 kHz code alternating currents and the 3 kHz code alternating currents must then be evaluated again together for purposes of decoding the samples. The quality of the filter depends on the bandwidth and the resonance frequency, so that if there is overlapping, the filter can accommodate a large number of code alternating currents or superposed alternating currents in the bandwidth of one speech channel, e.g. 3.2 kHz, 2.9 kHz, 2.6 kHz, 2.3 kHz, 2 kHz, 1.7 kHz, 1.4 kHz, 1.1 kHz, 0.8 kHz, 0.5 kHz; one is naturally not restricted to accommodating only PAM speech signals.

The use of superposed alternating currents also necessitates a synchronization. It suffices if, for synchronization at predetermined time intervals, only one code alternating current is transmitted in place of the superposed alternating current. If, in one system, all the frequencies are obtained by division or multiplication, it is enough to synchronize just one superposed alternating current. This principle can also be used for transmitting binary-coded signals as in FIGS. 2 and 3.

FIG. 2a shows a binary-coded alternating current in which the periods serve as code elements, and a small and a large amplitude value as significant conditions. Since the amplitude of the period serves as code element, it is sufficient to use e.g. the amplitude of the positive half-wave as sample. For coding the sample 4 alternating currents, each having a quarter the frequency of the binary-coded alternating current and being in phase quadrature with each other, are provided. The code elements P1,P5,P9, . . . are represented in FIG. 2b by the analog values of the amplitudes aP1, aP5, aP9, . . . , the code elements P2, P6, P10, . . . in FIG. 2c by the analog values aP2, aP6, aP10, . . . , the code elements P3, P7, P11, . . . by the analog values aP3, aP7, aP11, . . . , and the code elements P4, P8, P12, . . . by the analog values aP4, aP8, aP12, . . . If, e.g., a speech channel is digitalized with 64,000 bits, one needs, when coding according to FIG. 2a, a frequency of 64 kHz. By using 4 code alternating currents as in FIGS. 2b,c,d,e, only 16 kHz are required for each code alternating current. By superposing according to the principle of FIG. 10, only 2 alternating currents, each 16 kHz, need be transmitted.

FIG. 3a shows a binary-coded alternating current in which the half-waves serve as code elements and a large and a small amplitude value as significant conditions (see DE-PS No. 30 10 938). The samples are coded by way of 4 alternating currents of half the frequency, with the periods as code elements. If the half-waves are used for coding, the coding alternating currents need only a quarter of the frequency. In FIG. 3b the samples H1, H5, . . . are coded with the analog amplitudes aH1, aH5, . . . , the samples H2, . . . with the analog amplitudes aH2, . . . etc. The two remaining code alternating currents are not shown anymore, since this principle has also been disclosed in the FIGS. 2b to 2e.

FIG. 4 shows the principle of speech transmission according to the invention. The coder is designated with C. In it, samples of the speech band—with bandwidth up to 3.4 kHz—are converted into a 8 kHz code alternating current. Coding of the sample is effected by way of the period, as shown in FIG. 1b. Having been transmitted via the line Ltg, the code alternating current is transformed in the decoder Dc back into the samples, and from these values the speech alternating current is obtained again in the familiar manner. A filter Fi, which is shown in FIG. 5 and only allows the passage of 8 kHz code alternating current, can be inserted behind the coder or in front of the decoder. FIG. 6 shows the principle of a frequency-division multiplex transmission via 10 speech channels. A different sample frequency is assigned to each channel, namely for the 1st channel 8 kHz, for the 2nd 8.5 kHz., and for the 10th channel 12.5 kHz. The coder for channel 1 is designated with CF8, for channel 2 with CF8.5,. All the channels are then interconnected via filter Fi, and transmitted to the receiving end. Here the various code frequencies are separated again by filter Fi, and converted in the decoders DC into the sample values from which the speech alternating current is then obtained.

FIG. 7 shows a carrier-frequency transmission via 10 speech channels with a code alternating current of 8 kHz. The code alternating currents of 8 kHz arrive via inputs K1 to K10 at the modulators M, to which the carrier alternating currents Tr32, . . . are connected. The carrier spacing amounts to 1 kHz. In the subsequent filters Fi the respective carrier and the upper or lower side frequency are filtered out. At the receiving end the side frequencies are then separated again by filter Fi, and in the demodulators DM, to which the carriers Tr 32 are again connected, the code alternating current of 8 kHz is generated again. In the decoder—the coder is not shown at the transmitting end—this is converted again into a speech alternating current (3.4 kHz).

An example of a time-division multiplex application is represented in FIGS. 8 and 9. Transmission along channels K1 to K4 is intended to be of the time-division multiplex type. The sample frequency is again 8 kHz, the multiplex frequency 32 kHz. The samples from the 4 channels are distributed (P1,2, 3,4,5, . . . ) such that samples from one channel always ensue at intervals of 8 kHz. The multiplexer Mu in FIG. 9 taps the samples P1,P2,P3,4 . . . successively and transmits them on the amplitudes of the 32 kHz alternating current. The periods serve as code elements. From the coder C the 32 kHz code alternating current arrives via the line Ltg at the decoder DC, in which, from the 32 kHz alternating current, the sample values P1,P2,3 . . . are generated again. In the multiplexer DMu the samples are assigned again to the individual channels K1 to K4. Synchronization is necessary.

This principle is useful if low transmitting alternating current frequencies via radio are required, e.g. voice communications to submarines or caves. FIG. 12 shows the basic circuit diagram for a transmitter of this sort. In the oscillator OSc the code alternating current, is generated and is supplied to the coder C. The sample values P are likewise connected to this coder and impressed upon the half-waves or periods of the transmitting alternating current. The sample frequency is here synchronized with the oscillator frequency. The transmitting alternating current can e.g. be modulated up to 70%. From the coder C the code or transmitting alternating current arrives via amplification stages (not shown) at the amplifier V. After this there are two alternative paths: along the one, wanted and unwanted signals arrive directly at the end stage E while along the other, only the unwanted, or noise signals and harmonics, arrive at the end stage E; the filter Fi blocks the wanted signals. The signals which pass via the filter are phase-shifted by 180°, so that the noise signals and harmonics can be compensated at the end stage. This compensation of the unwanted signals can also ensure behind the end stage. In this case the filter is interconnected e.g. via a diplexer with the transmitting alternating current.

The superposing shown in FIG. 10 can be associated with phase errors, the compensation of which is explained by reference to FIGS. 13, 14 and 15. The superposed alternating currents are in phase quadrature with each other. If in FIG. 13 equal vectors are designated with Um and Vm, then the superposed alternating current is Üm; if the vectors alternate with respect to zero, the alternating currents are in phase quadrature; if the variations in amplitude of the two superposed alternating currents are smaller, then the phase shifts are also smaller. FIG. 14 shows a partial compensation. If a constant value Uk and Vk is assigned to each alternating current, the amplitude can never become zero; the alternating current will always have an amplitude of Uk or Vk. The two possible values of the vectors when U=0 and V=0 are Uuo and Üvo and the phase shift can assume, as a maximum, the value q. In FIG. 15 the phase jump is explained again. FIG. 15a shows the code alternating current Ü and FIG. 15b the code alternating current V in phase quadrature. It can be seen that at 90° the alternating current U is a maximum while V has the value 0. At 180° U is zero and V is a maximum. If at 180° V=0, the superposed alternating current in FIG. 15c would assume the value Vo. If at 270° U assumes the value 0, the superposed alternating current in FIG. 15c would assume the value Uo. There are 90° between Vo and Uo. One can, of course, also compensate the transient phenomena on the transmission path by repetition of the same amplitudes, e.g. 4 or 7 times, of the alternating currents shown in FIGS. 15a, b or c. Using filters, one can narrow down the bandwidth at the beginning or end of the transmission path. This method is only necessary if the coding values ought or have to be transmitted with absolute accuracy.

The frequencies of the code conversion alternating currents can be laid down arbitrarily, but care must be taken e.g. with pulse amplitude modulation that the greatest permissible spacing between samples is observed.

In order to prevent the smallest amplitude value of the coding alternating current from lying within the noise level, the smallest amplitude value it selected such that is lies beyond the noise level (e.g. FIG. 1a, P6, FIG. 2b aP5).

I claim:

1. A method for pulse amplitude modulation as a means for transmitting information, comprising the steps of:
    generating unipolar analog values from a signal to be transmitted and sampling the unipolar analog values at a preset sampling frequency;
    generating at least two code alternating currents in synchronism with subsets of said sampled unipolar analog values, and with a frequency equal to or half of said frequencies of said subsets;
    phase shifting said code alternating currents by equal amounts;
    modulating the amplitudes of each of said code alternating currents in time multiplex mode with the sampled unipolar analog values of the respective subset to provide an uninterrupted sequence of positive and negative half waves in the form of a continuous sinusoidal signal; and
    transmitting said uninterrupted sequence of positive and negative half waves in the form of a continuous signusoidal signal as a means for transmitting information based on said generated unipolar analog values.

2. A method for pulse amplitude modulation as a means for transmitting information, comprising the steps of:
    generating unipolar analog values from a signal to be transmitted and sampling the unipolar analog values at a preset sampling frequency;
    generating at least two code alternating currents in synchronism with subsets of said sampled unipolar analog values, and with a frequency equal to or half of said frequencies of said subsets;
    phase shifting said code alternating currents such that pairs of code alternating currents have a mutual phase difference of 90°;
    modulating the amplitudes of said code alternating currents and of the phase shifted alternating currents in time multiplex mode with the sampled unipolar analog values of the respective subset, and generating an uninterrupted sequence of positive and negative half waves in the form of a continuous sinusoidal signal;
    superposing said pairs of said modulated code alternating currents; and
    transmitting each said superposed code alternating current over one transmission channel in the form of a continuous sinusoidal signal as a means for transmitting information based on said generated unipolar analog values.

3. The method of claims 1 or 2, wherein said code alternating currents have equal frequencies of f/n where f is said sampling frequency and n is the number of said code alternating currents.

4. The method of claims 1 or 2, wherein said code alternating currents have arbitrary frequencies.

5. The method of claim 2, wherein a synchronization step is performed at the end of a transmitting stage.

6. The method of claim 2, wherein the amount of said phase shifting of said code alternating currents is 90°.

7. The method of claims 1 or 2, wherein the information to be transmitted is an analog signal.

8. The method of claims 1 or 2, wherein the information to be transmitted is an amplitude modulated alternating current representing a binary code.

9. The method of claim 8, wherein said sampling frequency is synchronized to said amplitude modulated alternating current.

10. The method of claims 1 or 2, wherein each of said sampling values is coded as the amplitudes of the positve and negative half waves of a full period of said code alternating currents with a frequency equal to the sampling frequency.

11. The method of claim 10, wherein said amplitudes of said code alternating currents are binary coded.

12. The method of claims 1 or 2, wherein each of said sampling values is coded as the amplitude of a half period of said code alternating currents with a frequency equal to half of the sampling frequency.

13. The method of claim 12, wherein only either the positive or only the negative half-wave of said code alternating currents is used to provide coded signals of said sampling values.

14. The method of claim 12, wherein the amplitudes of said half periods are binary coded.

15. The method of claims 1 or 2, wherein every said modulated code alternating current is superposed before transmission with an alternating current, which alternating current is generated from the code alternating current by filtering out the signal to be transmitted and wherein said generated alternating current is phase shifted by 180°, to eliminate harmonics and noise.

16. The method of claims 1 or 2, wherein the base level for generating said analog sampling values is chosen such that even the smallest amplitudes of said code alternating currents exceed the noise level in the transmission process.

17. The method of claim 15, wherein said superposition is performed in the end stage of a wireless transmission system with lowstage modulation.

18. The method of claims 1 or 2, used in a wireless transmission system in which a transmission alternating current is said code alternating current.

19. The method of claims 1 or 2, in which sampling is performed by a pulse train which is generated by superposing individual pulse trains each of which correspond to the frequency of an associated code alternating current.

20. The method of claims 1 or 2, wherein said generation of analog values is performed in time-multiplex mode from several signals to be transmitted in time-multiplex mode.

* * * * *